United States Patent Office.

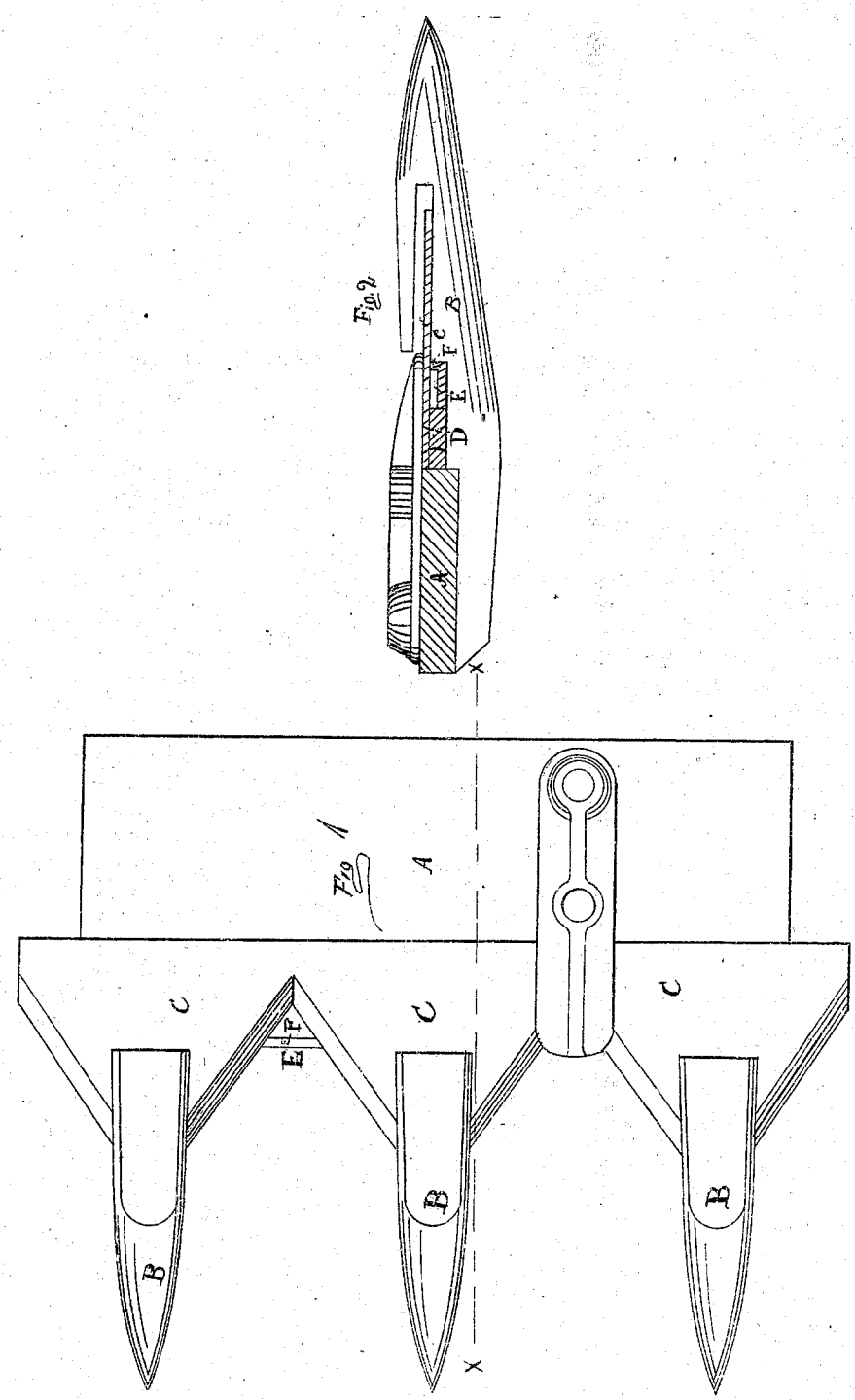

WILLIAM N. WHITELY, JR., JEROME FASSLER, AND OLIVER S. KELLY, OF SPRINGFIELD, OHIO.

Letters Patent No. 67,829, dated August 13, 1867.

---

IMPROVEMENT IN HARVESTER-CUTTERS.

---

*The Schedule referred to in these Letters Patent and making part of the same.*

---

TO ALL WHOM IT MAY CONCERN:

Be it known that we, WILLIAM N. WHITELY, Jr., JEROME FASSLER, and O. S. KELLY, of Springfield, in the county of Clark, and State of Ohio, have invented a new and useful Improvement in Harvesters Cutting Apparatus; and we do hereby declare the following to be a full, clear, and exact description of the same, reference being had to the accompanying drawings, in which—

Figure 1 is a plan view of the cutting apparatus of a harvester with our improvement attached.

Figure 2 is a vertical longitudinal section of the same on the line $x\ x$.

The nature of our invention consists in an improved construction of the nail-rod, whereby the friction of the cutting apparatus is reduced, and all clogging at the under side of the same is obviated.

That others may understand its construction and operation, we will more fully describe it.

A is the finger-bar, and B B the guard-fingers. C C are sections of the cutters attached to the cutter-bar D. As the cutters reciprocate back and forth across the fingers B they are guided at the back by the front edge of finger-bar A and in front by the rear edge of the nail-rod E. This rod has hitherto been made flat on its upper side, against which the under side of the cutters rest. While in operation the upper surface of the nail-rod becomes coated with gummy matter from the stalks of the grass being cut, and as this gummy matter is anti-lubricant the labor of moving the cutters is greatly increased, and sometimes the clogging from this cause is sufficient to arrest the motion of the cutters entirely and bring the machine to a stand-still. With a nail-rod of the form and position of the rod E, this clogging can never occur, because, in the first place, the amount of surface exposed is so small that even though it should be covered with gummy matter it would not offer any serious impediment to the movement of the cutters, and in the second place the entire pressure of the cutting apparatus, which commonly is formed by the wide surface of the nail-rod, is here concentrated upon the narrow edge F, which is turned up, as shown in fig. 2, for that purpose. The surface friction being thus proportionately increased renders it proportionately less liable to permit the entrance of any gummy matter from the cut grass. The angle formed between the lower surface of the cutter and the front edge of the nail-rod at their point of junction is a right angle. The extreme edge of the rod E is in contact with the lower side of the cutters, and this offers an obstacle to the entrance of any gummy matter, an obstacle which would not exist if this angle were less than a right angle.

Having described our invention, what we claim as new, and desire to secure by Letters Patent, is—

The nail-rod E, provided with the right-angled flange F, substantially as and for the purpose set forth.

WM. N. WHITELY, JR.,
JEROME FASSLER.
O. S. KELLY.

Witnesses:
S. D. CARPENTER,
GEO. ARTHUR.